(12) United States Patent
Nishizawa et al.

(10) Patent No.: US 6,973,430 B2
(45) Date of Patent: Dec. 6, 2005

(54) METHOD FOR OUTPUTTING VOICE OF OBJECT AND DEVICE USED THEREFOR

(75) Inventors: Manabu Nishizawa, Tokyo (JP); Masaki Hirabayashi, Tokyo (JP); Kimiko Tanabe, Tokyo (JP); Kazuya Koshimo, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 678 days.

(21) Appl. No.: 10/033,193

(22) Filed: Dec. 27, 2001

(65) Prior Publication Data

US 2002/0099539 A1 Jul. 25, 2002

(30) Foreign Application Priority Data

Dec. 28, 2000 (JP) .......................... 2000-401362
Dec. 17, 2001 (JP) .......................... 2001-382946

(51) Int. Cl.[7] .............................................. G10L 15/22
(52) U.S. Cl. ........................................ 704/272; 704/275
(58) Field of Search ................................ 704/251, 255, 704/272, 258, 259, 260, 261, 266, 269, 270, 275; 715/727, 728; 345/727, 728

(56) References Cited

U.S. PATENT DOCUMENTS

| | | | | |
|---|---|---|---|---|
| 5,966,691 A | * | 10/1999 | Kibre et al. ................ 704/260 |
| 6,173,260 B1 | * | 1/2001 | Slaney ........................ 704/250 |
| 6,334,106 B1 | * | 12/2001 | Mizuno et al. ............. 704/260 |
| 6,731,307 B1 | * | 5/2004 | Strubbe et al. ............. 345/727 |
| 6,826,530 B1 | * | 11/2004 | Kasai et al. ................. 704/258 |
| 6,859,778 B1 | * | 2/2005 | Bakis et al. ................. 704/277 |
| 6,865,533 B2 | * | 3/2005 | Addison et al. ............. 704/260 |
| 6,874,127 B2 | * | 3/2005 | Newell et al. ............... 715/744 |

FOREIGN PATENT DOCUMENTS

| | | |
|---|---|---|
| EP | 0 016 314 | 1/1980 |
| JP | 9146743 | 6/1997 |
| JP | 11-119791 | 4/1999 |
| JP | 2000-181897 | 6/2000 |
| JP | 2000-347692 | 12/2000 |
| WO | WO 92/08531 | 5/1992 |

* cited by examiner

*Primary Examiner*—Martin Lerner
(74) *Attorney, Agent, or Firm*—Katten Muchin Rosenman LLP

(57) ABSTRACT

The present invention detects a voice tone of a player based on input voice information, and then outputs voice data having a voice tone corresponded to the detected voice tone as voice data of an object, to thereby allow the player to operate a game object through voice input.

17 Claims, 14 Drawing Sheets

FIG. 5

| | PARAMETERS FOR LEADING CHARACTER | VALUE |
|---|---|---|
| 0 | LIFE | 0-255 |
| 1 | MENTAL POWER | % |
| 2 | APPARENT FEARFULNESS | % |
| 3 | SKILL LEVEL | % |
| 4 | ACCURACY LEVEL | % |
| 5 | RESIDUAL NUMBER OF BULLETS | % |
| 6 | ENEMY SEARCH ABILITY | % |
| 7 | ATTACK RANGE | MAYA |
| 8 | FIELD OF VIEW (FORWARD VIEW) | MAYA |
| 9 | SPEED | 16 STEPS (0-15) |
| 10 | TERROR | % |
| 11 | OFFENSIVE POWER | 0-255 |
| 12 | DEFENSIVE POWER | 0-255 |
| 13 | CONTINUOUS SHOOTING ABILITY | FRAME |
| 14 | DAMAGE COUNTER | 0-255 |
| 15 | CONSUMPTION LEVEL OF MAGAZINE | % |
| 16 | FIELD OF VIEW (ANGLE) | MAYA |
| 17 | FIELD OF VIEW (SENSE) | MAYA |
| 18 | SHORT-DISTANCE OFFENSIVE POWER | % |
| 19 | MIDDLE-DISTANCE OFFENSIVE POWER | % |
| 20 | LONG-DISTANCE OFFENSIVE POWER | % |
| 21 | DODGE SKILL FROM SHORT-DISTANCE ATTACK | % |
| 22 | DODGE SKILL FROM MIDDLE-DISTANCE ATTACK | % |
| 23 | DODGE SKILL FROM LONG-DISTANCE ATTACK | % |
| 24 | ENDURANCE POWER AGAINST SHORT-DISTANCE ATTACK | % |
| 25 | ENDURANCE POWER AGAINST MIDDLE-DISTANCE ATTACK | % |
| 26 | ENDURANCE POWER AGAINST LONG-DISTANCE ATTACK | % |

FIG. 6

| | PARAMETERS FOR ENEMIES | VALUE |
|---|---|---|
| 0 | LIFE | 0-255 |
| 1 | MENTAL POWER | % |
| 2 | APPARENT FEARFULNESS | % |
| 3 | SKILL LEVEL | % |
| 4 | ACCURACY LEVEL | % |
| 5 | RESIDUAL NUMBER OF BULLETS | % |
| 6 | ENEMY SEARCH ABILITY | % |
| 7 | ATTACK RANGE | MAYA |
| 8 | FIELD OF VIEW (FORWARD VIEW) | MAYA |
| 9 | SPEED | 16 STEPS (0-15) |
| 10 | TERROR | % |
| 11 | OFFENSIVE POWER | 0-255 |
| 12 | DEFENSIVE POWER | 0-255 |
| 13 | CONTINUOUS SHOOTING ABILITY | FRAME |
| 14 | DAMAGE COUNTER | 0-255 |
| 15 | CONSUMPTION LEVEL OF MAGAZINE | % |
| 16 | FIELD OF VIEW (ANGLE) | MAYA |
| 17 | FIELD OF VIEW (SENSE) | MAYA |
| 18 | SHORT-DISTANCE OFFENSIVE POWER | % |
| 19 | MIDDLE-DISTANCE OFFENSIVE POWER | % |
| 20 | LONG-DISTANCE OFFENSIVE POWER | % |
| 21 | DODGE SKILL FROM SHORT-DISTANCE ATTACK | % |
| 22 | DODGE SKILL FROM MIDDLE-DISTANCE ATTACK | % |
| 23 | DODGE SKILL FROM LONG-DISTANCE ATTACK | % |
| 24 | ENDURANCE POWER AGAINST SHORT-DISTANCE ATTACK | % |
| 25 | ENDURANCE POWER AGAINST MIDDLE-DISTANCE ATTACK | % |
| 26 | ENDURANCE POWER AGAINST LONG-DISTANCE ATTACK | % |
| 27 | STROKE ENDURANCE | % |
| 28 | FIRE ENDURANCE | % |
| 29 | WATER ENDURANCE | % |
| 30 | ACID ENDURANCE | % |
| 31 | THUNDER ENDURANCE | % |
| 32 | WEAK POINT ID | |
| 33 | PURSUING ABILITY (PERSISTENCY) | |
| 34 | CRITICAL ENDURANCE | |

FIG. 7

| | PARAMETERS FOR ARMS | VALUE |
|---|---|---|
| 0 | RANGE | M |
| 1 | WEIGHT (SIZE) | KG |
| 2 | OFFENSIVE POWER | 0-255 |
| 3 | CONTINUOUS SHOOTING SPEED | FRAME |
| 4 | NUMBER OF LOADING | 0-1023 |
| 5 | FIELD OF VIEW (FORWARD VIEW) | M |
| 6 | FIELD OF VIEW (ANGLE) | M |
| 7 | FIELD OF VIEW (SENSE) | M |
| 8 | BULLET LOADING TIME | FRAME |
| 9 | ATTACK RANGE | |
| 10 | ACCURACY | % |
| 11 | SHORT-DISTANCE OFFENSIVE POWER | % |
| 12 | MIDDLE-DISTANCE OFFENSIVE POWER | % |
| 13 | LONG-DISTANCE OFFENSIVE POWER | % |
| 14 | DODGE SKILL FROM SHORT-DISTANCE ATTACK | % |
| 15 | DODGE SKILL FROM MIDDLE-DISTANCE ATTACK | % |
| 16 | DODGE SKILL FROM LONG-DISTANCE ATTACK | % |
| 17 | ENDURANCE POWER AGAINST SHORT-DISTANCE ATTACK | % |
| 18 | ENDURANCE POWER AGAINST MIDDLE-DISTANCE ATTACK | % |
| 19 | ENDURANCE POWER AGAINST LONG-DISTANCE ATTACK | % |

FIG. 9

|  | RANGE | CONSTANT |  |
|---|---|---|---|
| MENTAL POWER | 0 TO 1 | 1 | WEAK ↔ STRONG |
| TERROR | 0 TO 1 | 0.15 | FEARLESS ↔ FEARFUL |
| SKILL LEVEL | 0 TO 1 | 1 | LESS ↔ MUCH |

FIG. 10

| | RANGE | CONSTANT | |
|---|---|---|---|
| MENTAL POWER | 0 TO 1 | 0.25 | WEAK↔STRONG |
| APPARENT FEARFULNESS | 0 TO 1 | 0.1 | FEARLESS↔FEARFUL |
| NUMBER OF ENEMIES NEARBY | 0 TO 1 | 0.1 | LESS↔MUCH |
| DISTANCE TO ENEMY | 0 TO 1 | 0 | CLOSE↔DISTANT |
| SKILL LEVEL | 0 TO 1 | 0.1 | LESS↔MUCH |

FIG. 13

| | RANGE | CONSTANT | |
|---|---|---|---|
| HIT RATIO OF OWN ATTACK | 0 TO 1 | 0.7 | LOW↔HIGH |
| TERROR | 0 TO 1 | 0.5 | FEARLESS↔FEARFUL |
| DISTANCE TO TARGET | 0 TO 1 | 0.4 | CLOSE↔DISTANT |
| NUMBERS OF ENEMIES NEARBY | 0 TO 1 | 0.5 | LESS↔MUCH |
| HIT RATIO OF ENEMY'S ATTACK | 0 TO 1 | 0.8 | LOW↔HIGH |
| DISTANCE TO ENEMY | 0 TO 1 | 0.6 | CLOSE↔DISTANT |

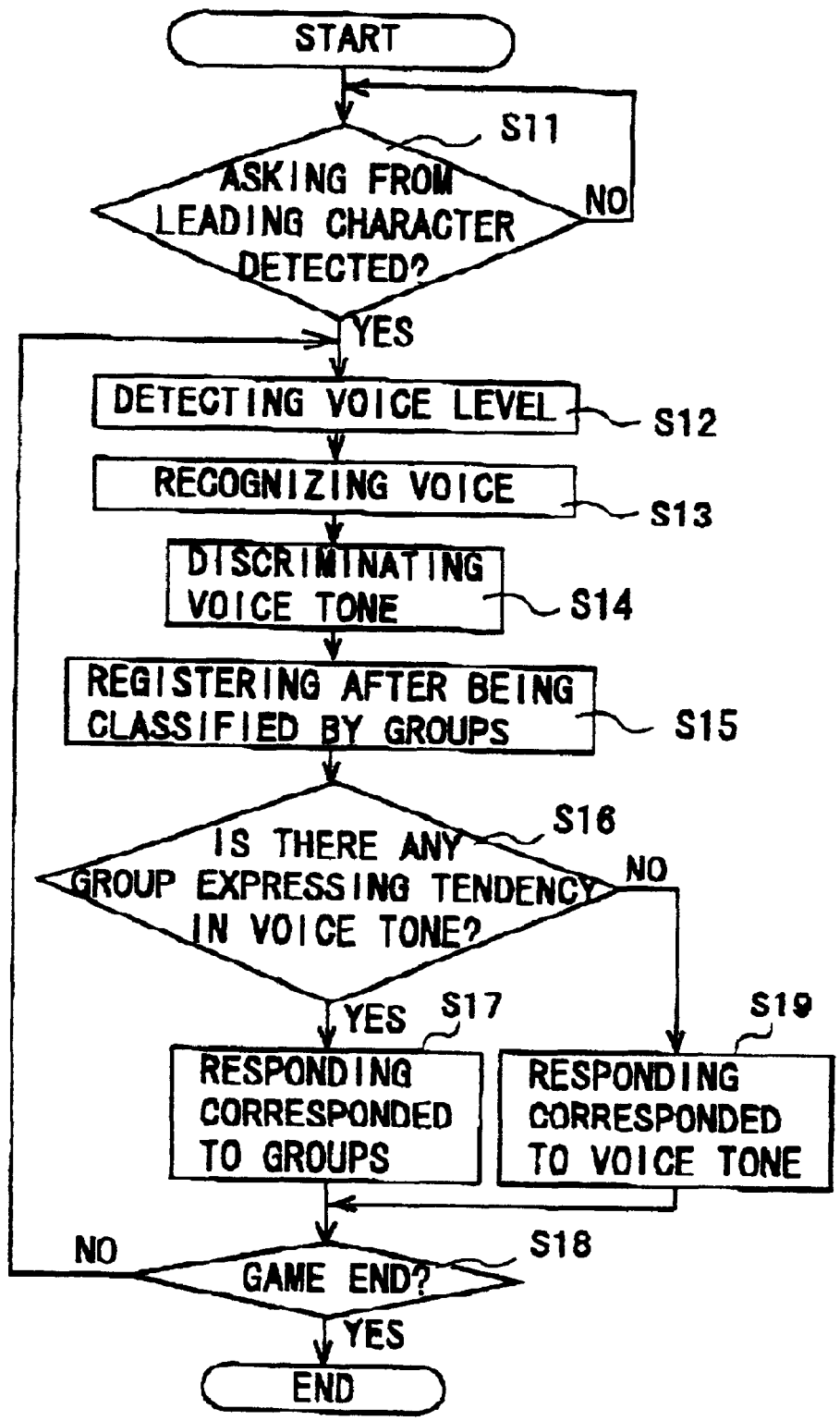

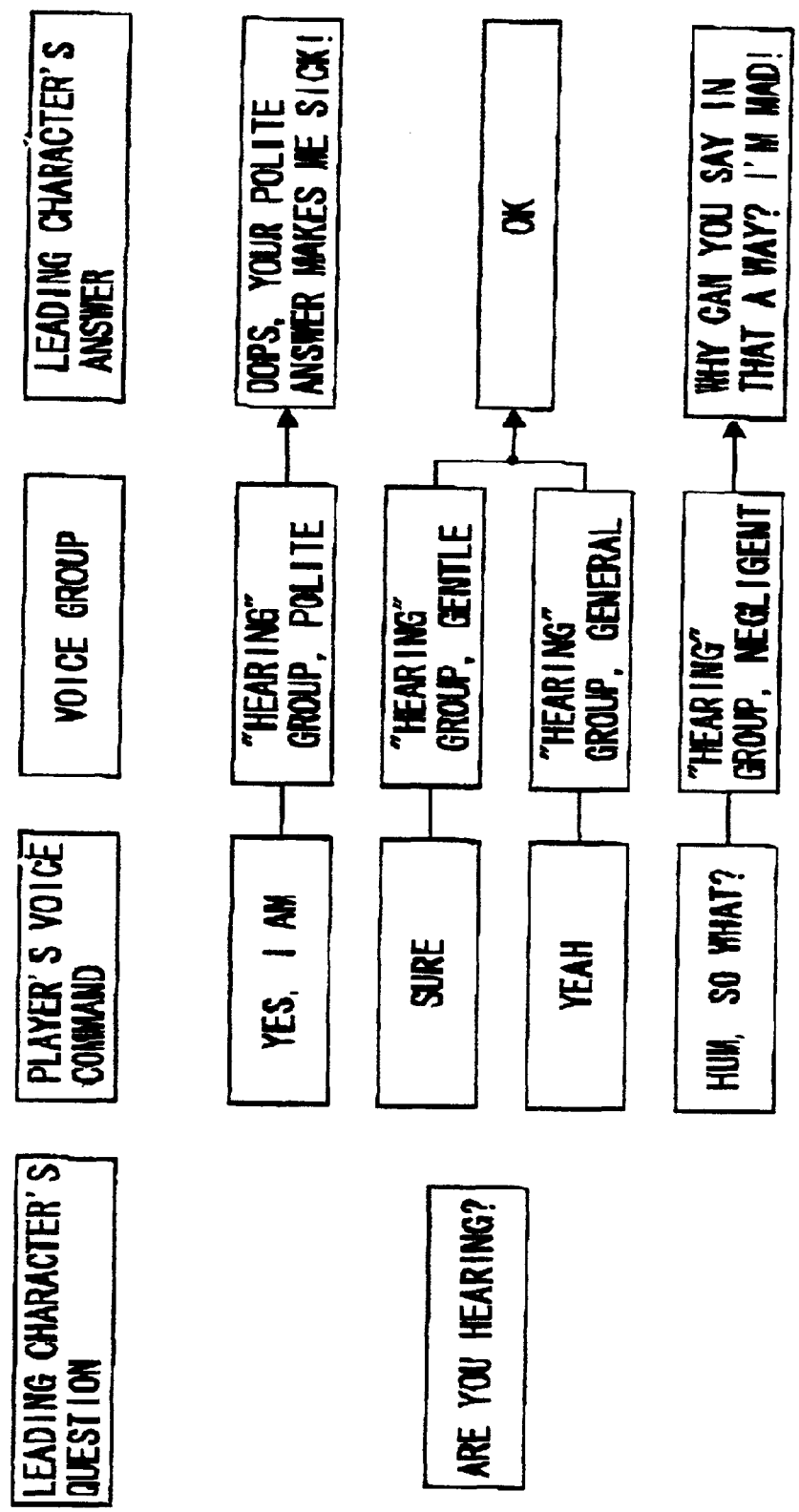

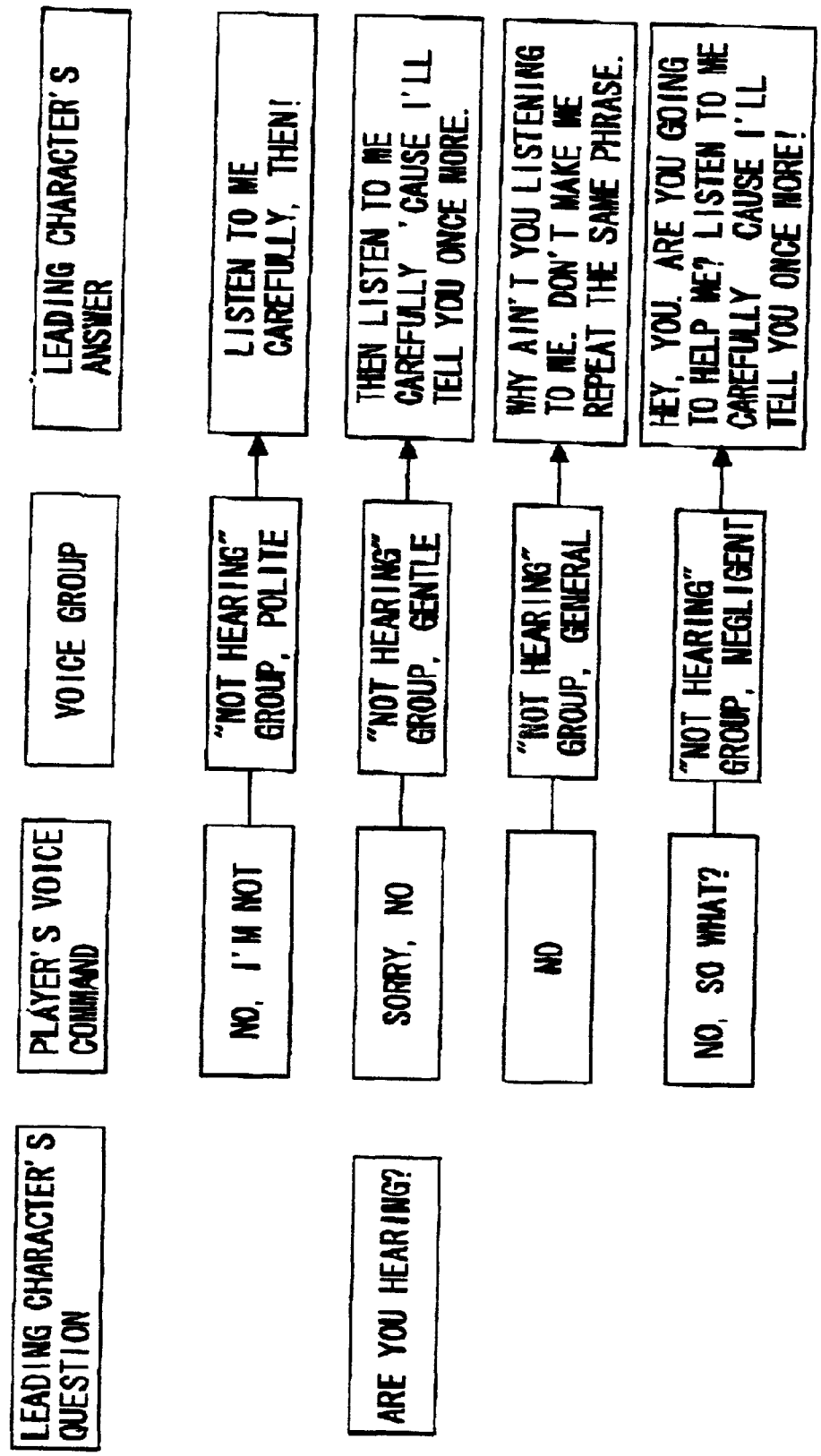

METHOD FOR OUTPUTTING VOICE OF OBJECT AND DEVICE USED THEREFOR

This application is related to Japanese Patent Application No. 2000-401362 filed on Dec. 28, 2000, based on which this application claims priority under the Paris convention and the content of which is incorporated herein by reference.

BACKGROUND OF THE INVENTION

1. Field of the Invention

The present invention relates to a method for object voice processing, a program execution device for executing a voice processing program, a recording medium having recorded therein a voice processing program, and a voice processing program; all of which are preferably applicable to video game machines or entertainment devices having video game function.

2. Description of the Related Art

In recent years, there are widely popularized video game machines for executing video games based on game programs which are stored in storage media such as CD-ROM, DVD-ROM and semiconductor memory.

Such video game machine is designed to allow a player to manipulate a game object which appears on a display screen through operating a controller plugged into the main unit of the video game machine. Thus, the player can enjoy a variety of video games including RPG (Role Playing Game), AVG (Adventure Game) and SLC (Simulation Game).

However in the conventional video game machine, the player could manipulate a game object only by operating the controller in hand, so that the player could only dedicate itself to operation of the controller in silence, which was less attractive in terms of enjoyment of manipulating the game object.

SUMMARY OF THE INVENTION

The present invention was proposed to address the foregoing problem, and an object thereof resides in that providing a method for voice processing, a program execution device for executing a voice processing program, a recording medium having recorded therein a voice processing program, and a voice processing program; all of which allow the player to manipulate a game object using the player's voice to thereby enhance enjoyment of the video game and pleasure of manipulating the game object.

The present invention detects a voice tone based on input voice information, and then outputs voice data having a voice tone corresponded to the detected voice tone. More specifically, in the present invention, when a player inputs some voice, a game object responds in a voice tone corresponded to the player's voice tone. This allows the player to operate a game object through voice input, and enhances enjoyment of the video game and pleasure of manipulating the game object.

Since the player's voice tone can be simulated by the game object's voice tone, also the personality of the player can be simulated by the personality of the game object. This successfully makes the player feel familiar to the game object and promotes empathy of the player, to thereby further enhance the enjoyment of the video game.

Other and further objects and features of the present invention will become obvious upon understanding of the illustrative embodiment about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 5 is a table showing exemplary parameters of the leading character appears in the video game executed on the video game machine of the embodiments;

FIG. 6 is a table showing exemplary parameters of an enemy character appears in the video game executed on the video game machine of the embodiment;

FIG. 7 is a table showing exemplary parameters of arms owned by the leading character appears in the video game executed on the video game machine of the embodiment;

FIG. 9 is a table showing exemplary parameters used when the leading character in a normal psychological state is displayed under control on the video game machine of the embodiment;

FIG. 10 is a table showing exemplary parameters used when the leading character encounters with the enemy character in the video game machine of the embodiment;

FIG. 13 is a table showing parameters used when, upon encountering with the enemy character, the leading character runs away therefrom on the video game machine of the embodiment.

FIG. 14 is a flow chart for explaining control of voice tone in voice output of the leading character corresponding to voice tone in voice input of the player on the video game are machine of the embodiment;

FIG. 15 is a chart for explaining exemplary positive responses of the leading character corresponded to voice tone in voice input of the player on the video game machine of the embodiment; and FIG. 16 is a chart for explaining exemplary negative responses of the leading character corresponded to voice tone in voice input of the player on the video game machine of the embodiment.

DETAILED DESCRIPTION OF THE PREFERRED EMBODIMENTS

Figure 1:
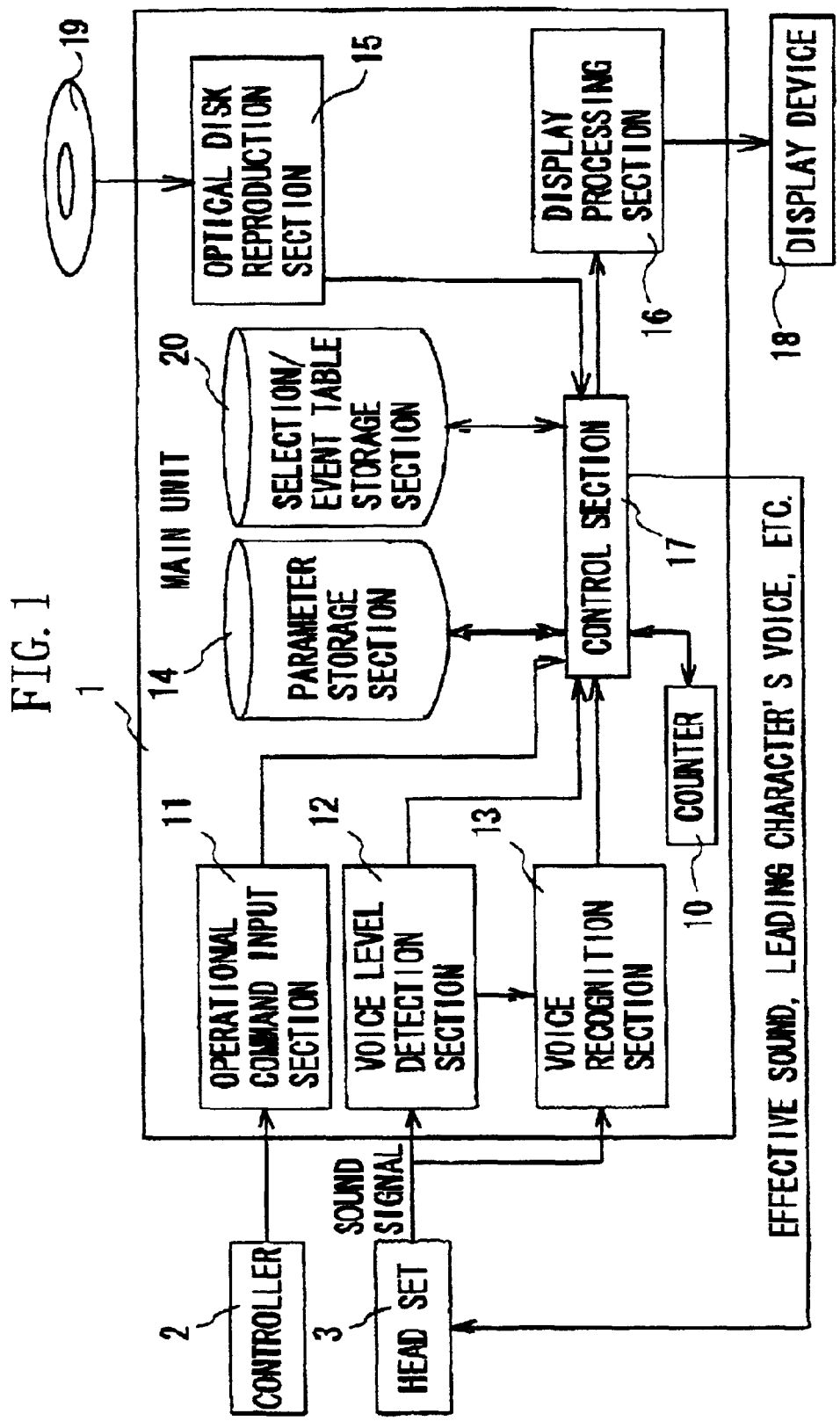
FIG. 1 is a block diagram of a video game machine according to an embodiment of the present invention.

The present invention is applicable, for example, to a video game machine as shown in FIG. 1.

General Constitution of Video Game Machine

The video game machine shown in FIG. 1 comprises a main unit 1 for executing a battle-type video game described below, a controller 2 to be handled by a player, and a head set 3 having integrated therein a sound outputting portion for outputting effective sound and so forth of such video game and a microphone set for picking up player's voice.

The main unit 1 comprises an operational command input section 11 to which operational commands are supplied from the controller 2 handled by the player, a voice level detection section 12 for detecting player's voice level based on sound signals transmitted from the microphone of the head set 3, a voice recognition section 13 for recognizing meaning of player's voice based on voice signals transmitted from the microphone of the head set 3, and a counter 10 for obtaining tone-based statistics of the player's voice by counting the player's voices as being classified into those of polite tone, gentle tone and so forth.

The main unit 1 also has a parameter storage section 14 for storing parameters expressing the number of enemies, apparent fearfulness, distance between the leading character and an enemy character and so forth read out from an optical disk 19; a selection/event table storage section 20 for storing a plurality of selection tables classified by the individual categories, where each selection table comprises a plurality of event tables and each event table contains a plurality of events expressing behaviors of the leading character and enemy characters; an optical disk reproduction section 15 for reading out such parameters or game programs from the optical disk 19 loaded thereon; a display processing section 16 responsible for the controlled display of game scenes onto a display device 18; and a control section 17 for controlling entire portion of such video game machine.

Constitution of Controller

Figure 2:
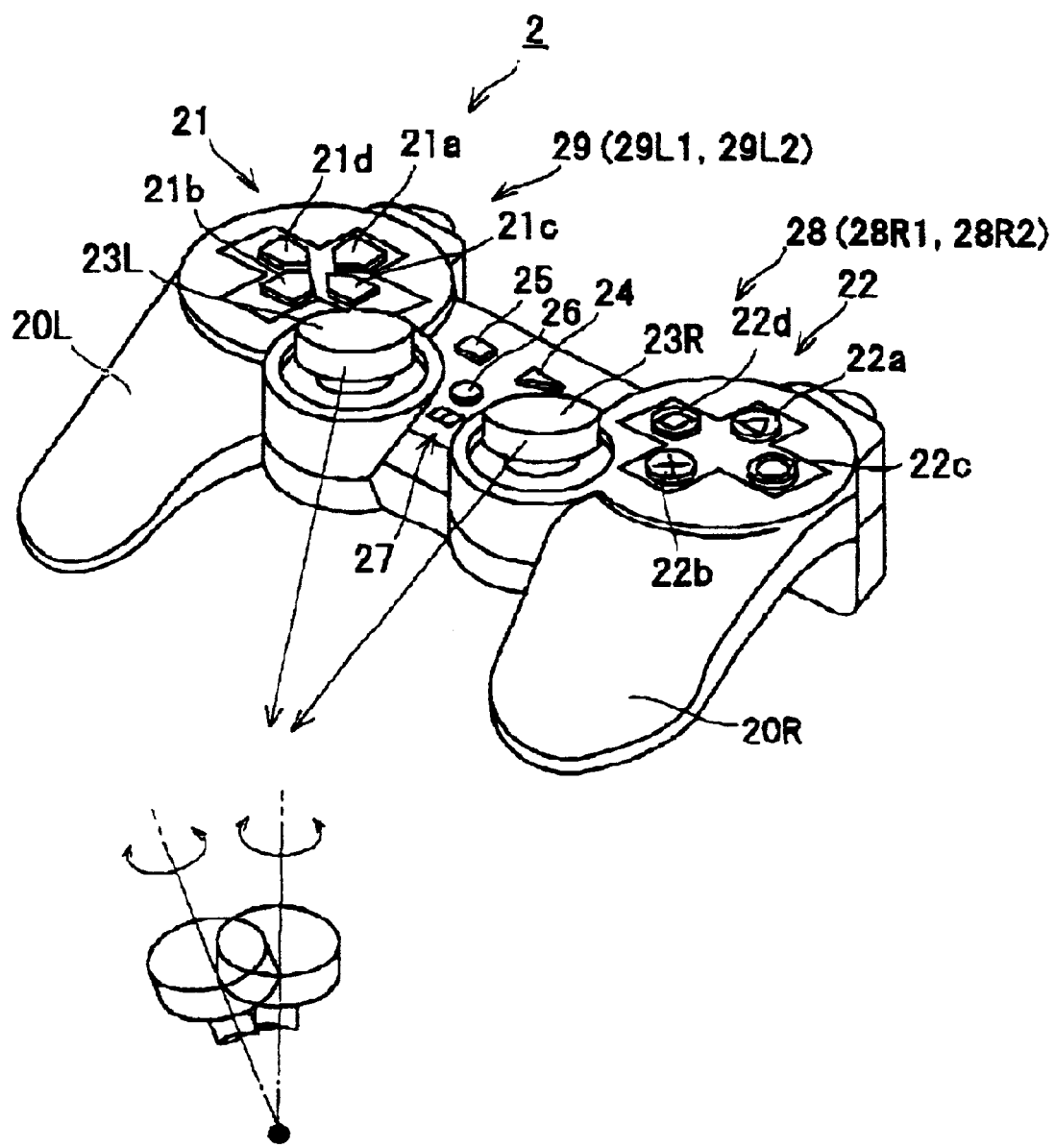
FIG. 2 is a perspective view of a controller connected to the video game machine of the embodiment.

An appearance of the controller 2 is shown in FIG. 2. As is clear from FIG. 2, the controller 2 has two grip ends 20R, 20L so as to allow a player to grip such grip ends 20R, 20L with the right and left hands, respectively, to thereby hold the controller 2.

The controller 2 also has first and second operational portions 21, 22 and analog operational portions 23R, 23L at positions operable by, for example, the individual thumbs while holding the grip ends 20R, 20L with the right and left hands, respectively.

The first operational portion 21 is responsible typically fox instructing an advancing direction of the game character, which comprises an upward prompt button 21a for prompting upward direction, a downward prompt button 21b for prompting downward direction, a rightward prompt button 21c for prompting rightward direction, and a leftward prompt button 21d for prompting leftward direction.

The second operational portion 22 comprises a "Δ" button 22a having a "Δ" marking, a "x" button 22b having a "x" marking, a "○" button 22c having a "○" marking, and a "□" button 22d having a "□" marking.

The analog operational portions 23R, 23L are designed to be kept upright (not-inclined state, or in a referential position) when they are not inclined for operation, but when they are inclined for operation while being pressed down, a coordinate value on an X-Y coordinate is detected based on the amount and direction of the inclination from the referential position, and such coordinate value is supplied as an operational output via the not-illustrated controller plug-in portion to the main unit 1.

The controller 2 is also provided with a start button 24 for prompting the game start, a selection button 25 for selecting predetermined subjects, and a mode selection switch 26 for toggling an analog mode and a digital mode. When the analog mode is selected with the mode selection switch 26, a light emitting diode 27 (LED) is lit under control, and the analog operational portions 23R, 23L are activated. When the digital mode is selected, a light emitting diode 27 (LED) is turned off under control, and the analog operational portions 23R, 23L are deactivated.

The controller 2 is still also provided with a right button 28 and a left button 29 at positions operable by, for example, the individual second fingers (or third fingers) while holding the grip ends 20R, 20L with the right and left hands, respectively. The individual buttons 28, 29 comprise first and second right buttons 28R1, 28R2 and first and second left buttons 29L1, 29L2, respectively, aligned side by side in the direction of the thickness of the controller 2.

The player is expected to operate these buttons to enter operational commands for the video game machine or characters.

Constitution of Head Set

Figure 3:
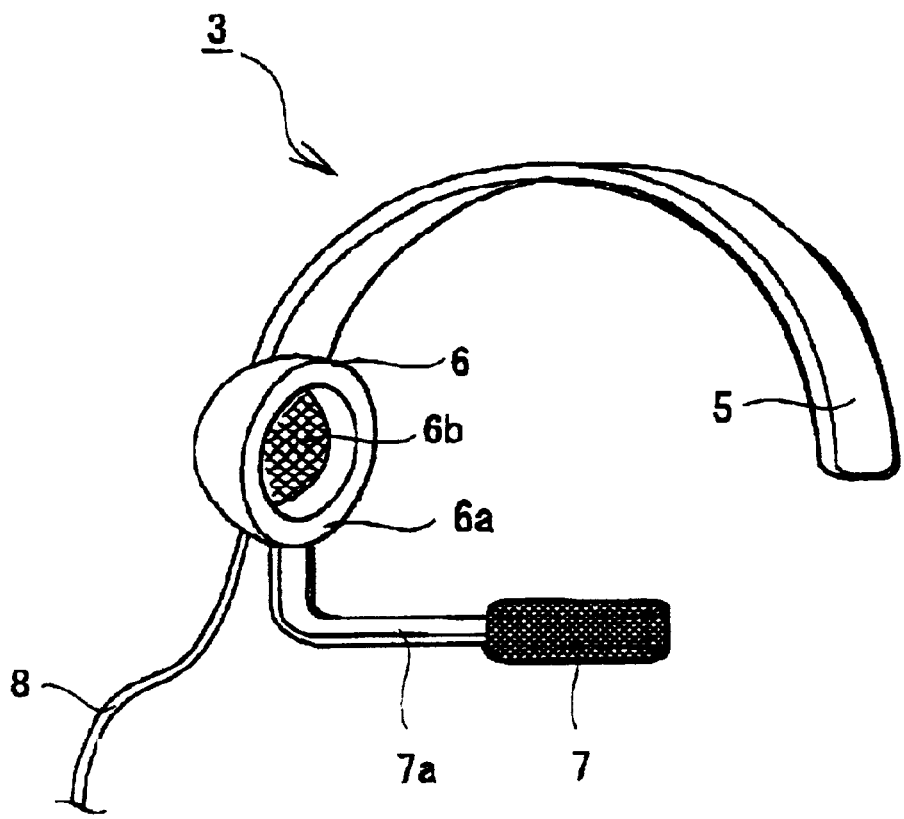
FIG. 3 is a perspective view showing a head set worn by a player in order to operate through voice a leading character of a video game executed by the video game machine of the embodiment.

As shown in FIG. 3, the head set 3 is typically designed for single-ear use, and has a fitting arm 5 for fitting the head set 3 onto the player's head, a sound outputting portion 6 provided at an end of the fitting arm 5, and a microphone 7.

The fitting arm 5 is designed in a curved shape so as to fit the human head profile, and so as to lightly press both sides of the player's head with both ends thereof, to thereby attach the head set 3 onto the player's head.

The sound outputting portion 6 has a pad portion 6a which can cover the entire portion of the player's right (or left) ear when the head set 3 is fitted on he player's head, and a speaker unit 6b for outputting effective sound and so forth of the video game. The pad portion 6a is composed, for example, of a soft material such as sponge so as to avoid pain on the player's ear caused by wearing such head set 3 for a long time.

The microphone 7 is provided on the end of a microphone arm 7a, the opposite end of which being attached to the sound outputting portion 6. The microphone 7 is designed to be positioned close to the player's mouth when the head set 3 is fitted on the player's head, which is convenient for picking up players voice and supplying sound signals corresponded thereof through a cable 8 to the voice level detection section 12 and the voice recognition section 13 of the main unit 1.

Although the following explanation deals with the head set 3 designed for single-ear use, it should be noted that the binaural specification is also allowable such as a general headphone. The sound outputting portion may have an inner-type earphone, which will be advantageous in reducing the size and weight of such head set.

It should also be noted that while the head sat 3 herein is designed to be fitted on the player's head using the fitting arm 5, it is also allowable to provide a hook to be hung on either of the player's ears, to thereby allow the head set to be fixed on one side of the player's ear with the aid of such hook.

Executive Operation of Video Game

Next, executive operation of a battle-type video game on the video game machine of this embodiment will be explained.

In this battle-type video game, a leading character moves from a start point to a goal point along a predetermined route, during which the leading character encounters with enemy characters. Thus, the player operates the controller 2 and also speaks to the leading character in the displayed scene through the microphone 7 of the head set 3 to encourage it or make such leading character fight with enemy characters while giving instructions on the battle procedures. The player thus aims at the goal while defeating the enemy characters in such fights.

In the execution of such battle-type video game, the player loads the optical disk 19 having stored therein such battle-type video game into the main unit 1, and then press the start button 24 of the controller 2 to prompt the game start. An operational command for prompting the game start is then supplied through the operational command input section 11 to the control section 17 so as to control the optical disk reproduction section 15, to thereby reproduce a game program, the individual parameters for the leading character, enemy characters and arms owned by the leading character, a plurality of event tables containing a plurality of tabulated events expressing behaviors of the leading character and enemy characters, and a plurality of selection table comprising a plurality of event tables classified by the individual categories and so forth.

The control section 17 stores under control the individual parameters reproduced by the optical disk reproduction section 15 into the parameter storage section 14, and the individual selection tables and event tables into the selection/event table storage section 20.

From such optical disk 19, also reproduced is voice information provided for the individual voice tones of the leading character 31 as described later. The voice information provided for the individual voice tones are stored under control in the selection/event table storage section 20, and are properly read out by the control section 17 to be supplied to the head set 3 worn by the player.

The control section 17 also generates a game scene of the battle-type video game based on the game program reproduced by the optical disk reproduction section 15 and operation through the controller 2 by the player, and then displays such scene on the display device 18 after processing by the display processing section 16.

Figure 4:
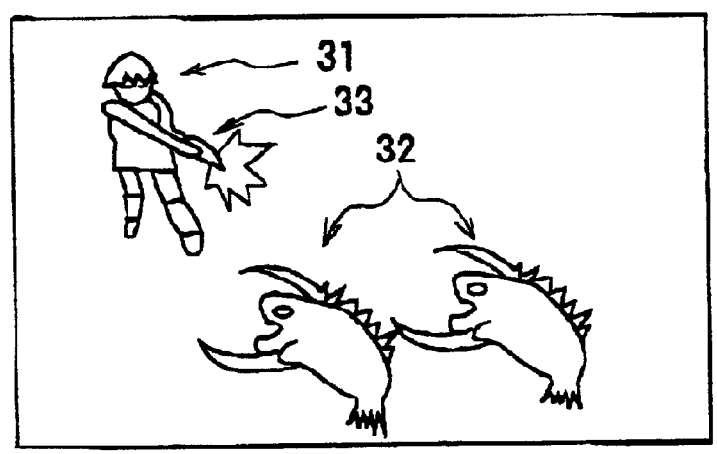
FIG. 4 is a drawing of an exemplary game scene displayed on the video game machine of the embodiment.

FIG. 4 shows one scene of such game, in which a leading character 31 encounters with an enemy character 32 during the travel along the travel route, and points arms 33, such as laser beam gun, at the enemy character 32.

Parameters

The leading character 31, enemy character 32 and arms 33 used by the leading character 31 are individually provided with parameters allowing real-time changes.

Leading Character Parameters

Parameters owned by the leading character 31 are composed as shown in FIG. 5, which typically include vital power (life, mental power, apparent fearfulness, skill level, accuracy level, residual number of bullets on the arms 33, enemy search ability, attack range, direction of field of view (forward field of view), motional speed (speed), terror, offensive power, defensive power, continuous shooting ability of the arm 33, damage score (damage counter), decreasing rate of bullets in a magazine of the arm 33 (consumption level of magazine), angle of field of view, sensitivity of field of view (field of view (sense)), short-distance offensive power, middle-distance offensive power, long-distance offensive power, dodge skill from short-distance attack by the enemy (dodge characteristic), dodge skill from middle-distance attack by the enemy, dodge skill from long-distance attack by the enemy, endurance power against short-distance attack by the enemy (defensive characteristic), endurance power against middle-distance attack by the enemy, and endurance power against long-distance attack by the enemy.

Among these, vital power, offensive power, defensive power, and damage score are expressed by values from 0 to 255, which decrease depending on damage caused by the enemy. The motional speed is expressed in 16 steps from 0 to 15. The subjects listed from "mental power" to "enemy search ability", terror, consumption level of magazine, and subjects listed from "short-distance offensive power" to "endurance power against long-distance attack" are expressed in percent (%).

The continuous shooting ability is expressed by the number of frames for displaying such continuous shooting. The attack range, direction of field of view (forward field of view), angle of field of view, and sensitivity of field of view are individually expressed in a unit of "maya".

Enemy Character Parameters

Parameters owned by the enemy character 32 are composed as shown in FIG. 6, which typically include vital power (life), mental power, apparent fearfulness, skill level, accuracy level, residual number of bullets on the arms, enemy search ability, attack range, direction of field of view (forward field of view), notional speed (speed), terror, offensive power, defensive power, continuous shooting ability of the arm, damage score (damage counter), decreasing rate of bullets in a magazine of the arm (consumption level of magazine), angle of field of view, sensitivity of field of view (field of view (sense)), short-distance offensive power, middle-distance offensive power, long-distance offensive power, dodge skill from short-distance attack by the leading character (dodge characteristic), dodge skill from middle-distance attack by the leading character, dodge skill from long-distance attack by the leading character, endurance power against short-distance attack by the leading character (defensive characteristic), endurance power against middle-distance attack by the leading character, and endurance power against long-distance attack by the leading character.

Other parameters specific to enemy characters include endurance power against attack by the leading character (stroke endurance), endurance power against attack by the leading character using a flame thrower (fire endurance), endurance power against attack by the leading character using a water thrower (water endurance), endurance power against attack by the leading character using an acid thrower (acid endurance), endurance power against thunder shock caused by the leading character (thunder endurance), weak point ID, ability for pursuing the leading character (persistency), and critical endurance.

Among these, vital power, offensive power, defensive power, and damage score are expressed by values from 0 to 255, which decrease depending on damage given by the leading character. The notional speed is expressed in 16 steps from 0 to 15. The subjects listed from "mental power" to "enemy search ability", terror, consumption level of magazine, and subjects listed from "short-distance offensive power" to "weak point ID" are expressed in percent (%).

The continuous shooting ability is expressed by the number of frames for displaying such continuous shooting. The attack range, direction of field of view (forward field of view), angle of field of view, and sensitivity of field of view are individually expressed in a unit of "maya".

Arms Parameters

Parameters for the arms 33 owned by the leading character 31 is composed as shown in FIG. 7, which typically include range, weight (size), offensive power, continuous shooting speed, number of loading, direction of field of view (forward field of view), angle of field of view, sensitivity of field of view (field of view (sense)), bullet loading time, attack range, shooting accuracy, short-distance offensive power, middle-distance offensive power, long-distance offensive power, dodge skill from short-distance attack by the enemy (dodge characteristic), dodge skill from middle-distance attack by the enemy, dodge skill from long-distance attack by the enemy, endurance power against short-distance attack by the enemy (defensive characteristic), endurance power against middle-distance attack by the enemy, and endurance power against long-distance attack by the enemy.

Among these, the range, direction of field of view (forward field of view), angle of field of view, and sensitivity of field of view are expressed in meter (m), and the offensive power is typically expressed by values from 0 to 255. The weight is expressed in kilogram (kg), the number of loading in values from 0 to 1023, and the continuous shooting speed and bullet loading time in the number of frames for displaying such continuous shooting. The subjects listed from "shooting accuracy" to "endurance power against long-distance attack by the enemy" are individually expressed in percent (%).

Display Control Based on Parameters

Such individual parameters are read out from the optical disk 19 as described in the above, and then stored in the parameter storage section 14 shown in FIG. 1. The control section 17 properly reads out the parameter from the parameter storage section 14 depending on a scene or situation, to thereby display under control behaviors of the leading character 31, enemy character 32 and arms 33 used by the leading character 31.

A process flow of the controlled display based on such parameters will be explained referring to a flow chart of FIG. 8. The process flow starts when the main unit 1 starts the video game, and the process by the control section 17 advances to step S1.

In step S1, the control section 17 reads out parameters for the normal state from various parameters stored in the parameter storage section 14, and then, in step S2, displays under control the leading character 31 moving along a predetermined route while keeping a psychological state corresponded to such normal parameters.

Examples of the parameters for the normal state of the leading character 21 read out from the parameter storage section 14 include mental power, terror and skill level as listed in FIG. 9 The individual values of such parameters for the normal state of the leading character 31 are "1" for the mental power, "0.15" for terror, and "1" for skill level.

The "mental power" parameter ranges from 0 to 1 (corresponding to weak to strong) depending on the mental condition of the leading character; the "terror" parameter ranges also from 0 to 1 (corresponding to fearless to fearful) depending on the number or apparent fearfulness of the enemy characters; and the "skill level" parameter ranges again from 0 to 1 (corresponding to less to much) depending on the number of times the game is executed, in which the leading character 31 gains experience by repeating battles with the enemy character 32.

The enemy character 32 is programmed to attack the leading character 31 at predetermined points on the travel route. In step S3 in the flow chart shown in FIG. 8, the control section 17 determines whether the enemy character 32 which may attack the leading character 31 appeared or not, and the process thereof returns to step S2 when the enemy character 32 was not found, to thereby display under control actions of the leading character 31 based on the foregoing parameters for the normal state. This allows the leading character 31 to keep on traveling along the predetermined route.

On the contrary, when the enemy character 32 appeared, the control section 17 reads out in step S4 from the parameter storage section 14 the parameters of the leading character 31 for the case of encountering with the enemy character 32.

The parameters of the leading character 31 read out from the parameter storage section 14 for the case of encountering with the enemy character 32 include, as typically listed in FIG. 10, those for mental power of the leading character, apparent fearfulness of the enemy character 32, number of the enemies nearby, distance to the enemy character 32 and skill level.

As is clear from FIG. 10, the individual values of such parameters of the leading character 31 for the case of encountering with the enemy character 32 are "0.25" for the mental power, "0.1" for the apparent fearfulness of the enemy character 32, "0.1" for the number of enemies nearby, "0" for the distance to the enemy character 32, and "0.1" for the skill level.

The control section 17 displays under control actions of the leading character 31 based on the parameters listed in FIG. 10 for the case of encountering with the enemy character 32, where the display of such actions of the leading character 31 can be altered depending on the presence or absence of voice input by the player in such controlled display.

More specifically, the control section 17 determines in step S5 the presence or absence of the player's voice input upon reading out the parameters or the leading character 31 for the case of encountering with the enemy character 32, and the process thereof advances to step S9 when the voice input from the player is detected, and advances to step S6 when not detected.

In step S6, reached after detecting no voice input from the player, the control section 17 displays under control the leading character 31 using parameters of such leading character 31 read out from the parameter storage section 14 for the case of encountering the enemy character 32 without alteration.

On the other hand in step S9, reached after detecting voice input from the player, the control section 17 alters the individual parameters of the leading character 32, read out from the parameter storage section 14 for the case of encountering the enemy character 32, into values corresponding to the player's voice input, and then in step S6, actions of the leading character 31 are displayed under control based on such altered values of the parameters.

Figure 11:
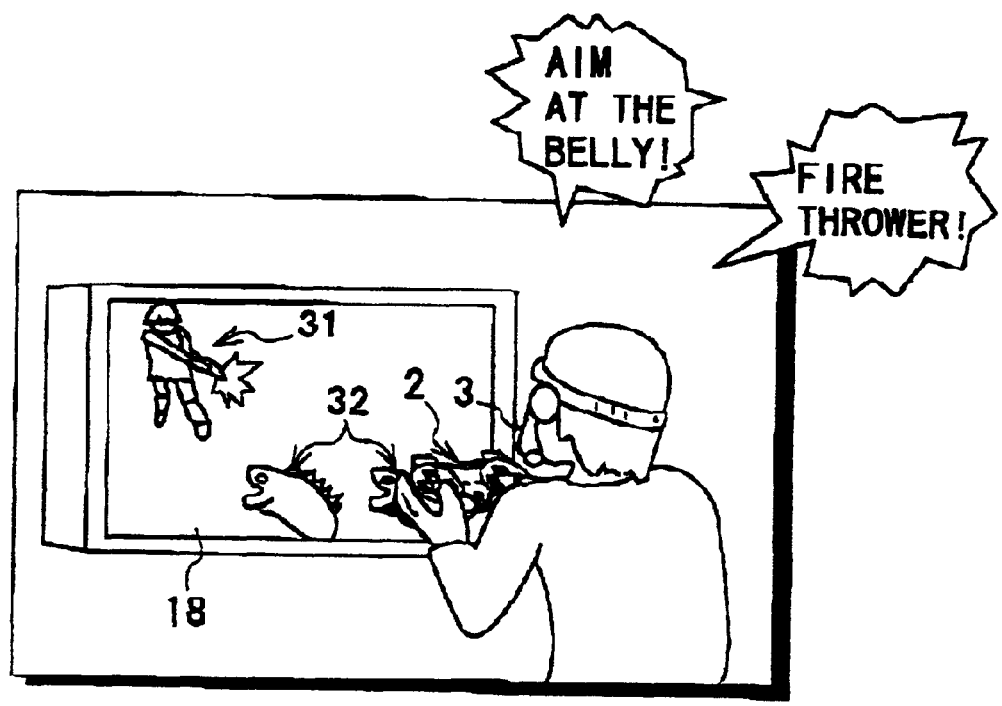
FIG. 11 is a schematic drawing showing a player giving through voice input an instruction to the leading character on a display screen of the video game machine of the embodiment.

FIG. 11 shows an exemplary scene in which the enemy character 32 appeared in front of the leading character moving along the route. In such exemplary case, in order to make the leading character 31 fight with the enemy character 32, the player not only controls the controller 2, but also gives instructions to the leading character 31 through voice such as "Take the fire thrower!" so as to designate an arm to be used for attacking the enemy character 32, and such as "Aim at the belly!" so as to designate a weak point of the enemy character 32 to be aimed at.

The player's voice is picked up by the microphone 7 of the head set 3 shown in FIG. 3, converted into sound signals, which are then supplied to the voice recognition section 13. The voice recognition section 13 analyzes meaning of the phrase spoken by the player based on waveform pattern of such sound signals, and supplies the analytical results to the control section 17. The control section 17 then alters the values of the individual parameters, read out in step S4, of the leading character 31 for the case of encountering with the enemy character 32 based on such analytical results. Actions of the leading character 31 are displayed under control based on such altered parameters.

Figure 12:
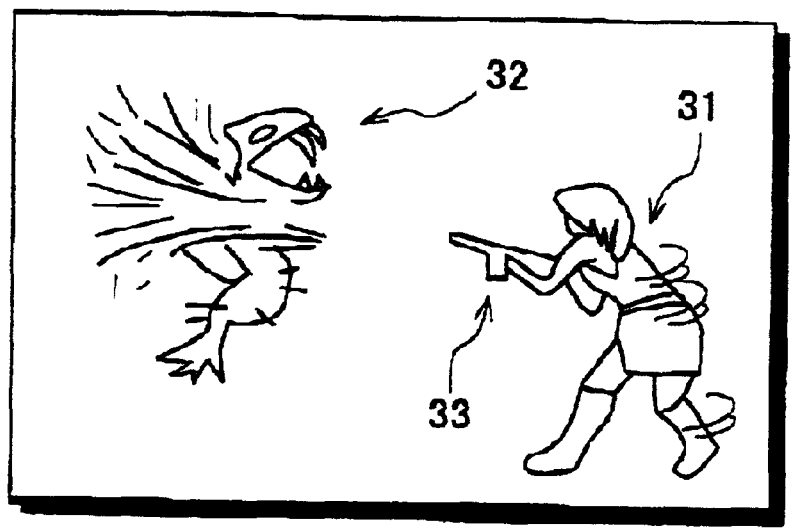
FIG. 12 is a schematic drawing showing a scene in which the leading character instructed by the player's voice input is fighting with the enemy character on the video game machine of the embodiment.

In such exemplary case, in which the instructions of "Take the fire thrower!" and "Aim at the belly !" were made by the player, the control section 17 allows the controlled display such that the leading character 31 holds a fire thrower as the arms 33 and throws fire to the enemy character 32 using such fire thrower to thereby expel it as shown in FIG. 12.

Figure 8:
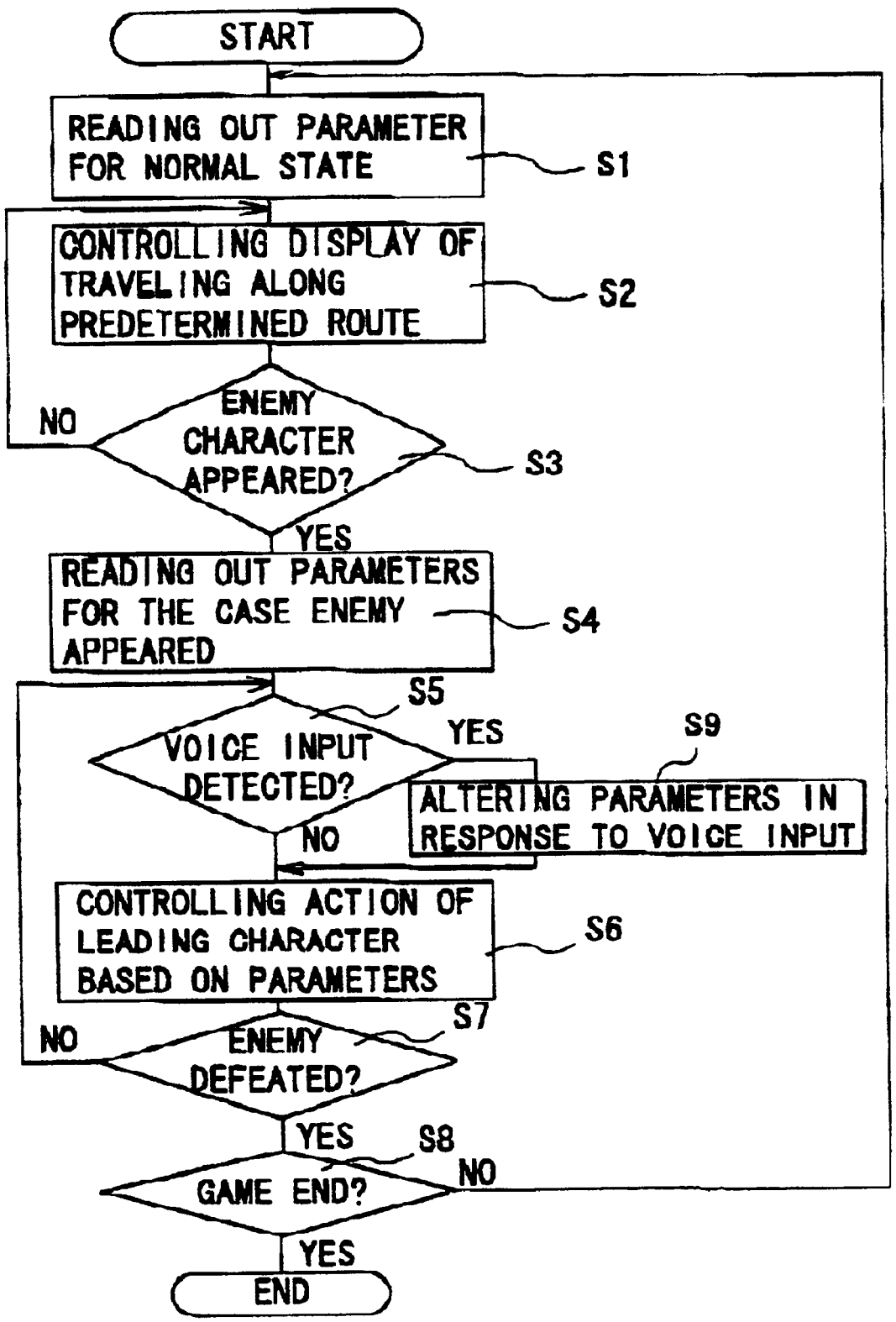
FIG. 8 is a flow chart for explaining voice input operation for the video game machine of the embodiment.

In step S7 in the flow chart shown in FIG. 8, the control section 17 determines whether the enemy character 32 was defeated or not, and the operation of the main unit 1 advances to step S8 for the case the enemy character 32 was defeated, and returns to step S5 when not defeated. Then presence or absence of the player's voice input is determined in step S5 as described in the above, and again in step S9 or step S6, actions of the leading character 31 are displayed under control based on the parameters corresponding to the presence or absence of the player's voice input.

In step S9, whether the video game was completed either in response to defeat of the enemy character 32 or in response to instruction of end of the game issued by the player is determined, and the entire routine of the flow chart shown in FIG. 8 is terminated without any other operations when the end of the game was detected, and the operation of the control section 17 returns to step S1 when the game is not completed yet. The control section 17 then roads out the parameters of the leading character 31 for the normal state from the parameter storage section 14, and displays under control the leading character 31 with the parameters for the normal psychological state so as to travel along a predetermined route.

Escaping Action from Enemy Character

While the above description dealt with the case that the leading character 31 fights with the enemy character 22, the leading character 31 does not always fight with the encountered enemy character 32, and the actions thereof may differ depending on the psychological state (parametric values).

More specifically, when a value of the "terror" parameter of the leading character 31 encountering with the enemy character 32 is higher than a predetermined value, the control section 17 displays under control the leading character 31 such that running away from the enemy character 32. FIG. 13 shows the individual parametric values for the leading character 31 in such situation.

As is clear from FIG. 13, when the leading character 31 runs away from the enemy character 32, the individual values of such parameters are "0.7" for the hit ratio of own attack, "0.5" for the terror, "0.4" for the distance to the target, "0.5" for the number of enemies nearby, "0.8" for the hit ratio of the enemy's attack, and "0.6" for the distance to the enemy. The control section 17 is allowed to display under control the leading character 31 such that running away from the enemy character 32 for example when the values for the "terror" parameter exceeds "0.5".

When the player encourages the leading character 31 about to run away with a word such as "Hold out !" or "Don't run away!", the control section 17 lowers the value for the "terror" parameter by a predetermined value. If the lowered value for the "terror" parameter becomes "0.4" or below, the control section 17 displays under control actions of the is leading character 31 based on the parameters for the normal state as described previously referring to FIG. 9. The leading character 31 now has the normal psychological state, stops running away from the enemy character 32 and begins to advance along a predetermined route in a normal way of walking.

Even if the player speaks the words, the controlled display of the leading character 31 such that running away will be retained by the control section 17 if the "terror" parameter still remains at "0.5" or above. In this case, the leading character 31 keeps on running away from the enemy character 32 disobeying the player. When the leading character 31 came far enough from the enemy character 32, the control section 17 lowers the value of the "terror" parameter to thereby display under control the leading character 31 so as to have normal actions.

Voice Instruction for Cases Other than Encountering Enemy Character

The player watching the leading character 31 moving along the route may speak to such leading character 21 in the displayed scene such as "Watch out!" or "Be careful!" when the player feels a sign of abrupt appearance of the enemy character 32. Upon receiving such voice input, the control section 17 typically raises the value of the "terror" parameter of the leading character 31 by a predetermined range, and displays under control the leading character based on such raised parametric value.

Since the value of the "terror" parameter was raised by a predetermined range, the control section 17 displays under control the leading character 31 so as to make careful steps along the route while paying attention to the peripheral, which was altered from the previous normal steps.

When the leading character 31 walking with careful steps encounters with the enemy character 32 as expected, the control section 17 displays under control actions of the leading character 31 based on the parameters for the case encountering with the enemy character 32, which were previously explained referring to FIG. 10.

When the leading character 31 walking with careful steps did not encounter with the enemy character 32 and it was defined as no more dangerous, the player then gives voice instruction such as "Out of danger. Forward normally". The control section 17 reads out the parameters for the normal psychological state according to such voice input as previously explained referring to FIG. 9, to thereby displays actions of the leading character 31 based on such parameters.

Conversation of Player with Leading Character

While the above description may suggest that only the player one-sidedly gives instructions to the leading character 31, the actual game proceeds while allowing the leading character 31 to occasionally ask the player something or answer to the player, and allowing such player to reply to a question of the leading character 31 or give some instruction on the next action, to thereby control the behavior of the leading character 31 through conversation therewith. The voice tone of the leading character 31 is programmed to vary depending on the voice tone in the response or instruction of the player.

FIG. 14 is a flow chart showing a process flow according to which the leading character 31 completes a response to a player in a voice tone corresponded to the player's voice tone.

The process flow starts from step S11 when the video game begins. The control section 17 reads out from the selection/event table storage section 20 a sound signal for a question issued by the leading character 31 according to a predetermined timing, and send the signal to the head set 3 worn by the player.

In step S11, the control section 17 discriminates whether the leading character 31 asked a question to the player or not by discriminating whether the sound signal for the question issued by the leading character 31 was sent to the head set 3 worn by the player or not. The control section 17 is brought into a stand-by mode until a question is issued for the case the leading character 31 did not ask any question, and the process thereof advances to step S12 for the case the question was detected.

When the question is issued by the leading character 31, the player will answer the question. The player's voice as the answer is picked up by the microphone 7 of the head set 3, and supplied as sound signal to the voice level detection section 12 and the voice recognition section 13 In step S12, the voice level detection section 12 determines the player's voice level by detecting the level of the sound signal, and sends a level detection output to the control section 17. In step S13, the voice recognition section 13 analyzes meaning of the player's voice based on the waveform pattern of the sound signal, and sends the analytical results to the control section 17.

Next, in step S14, the control section 17 detects the player's voice tone based on the level detection output from the voice level detection section 12 and the analytical result of the meaning of the player's voice from the voice recognition section 13, and then registers the detection result into tone groups classified by voice tones in step S15.

While the following description deals with the case in which the player's voice tone is detected based on the level detection output from the voice level detection section 12 and the analytical result of the meaning of the player's voice from the voice recognition section 13, it is also allowable that the player's voice tone is detected based only on the analytical result of the meaning of the player's voice. Nevertheless, the detection of the voice tone involving level detection output from the voice level detection section 12 will raise accuracy in such detection.

Each voice tone group is assigned with a counter 10, a value of which is incremented by one when the group is registered with the player's voice tone after being classified by the control section 17.

Such registration operation is repeated each time the player's voice tone is analyzed, so that the count of the voice tone group corresponded to a frequently used voice tone will be incremented by one as the video game proceeds (each time the player utters). Thus, a tendency in the player's voice tone which is frequently used is expressed by the counts of the individual counters 10.

In step S16, the control section 17 discriminates whether there is any group expressing a tendency in the player's voice tone or not by confirming whether the count value of each voice tone group equals to or exceeds a predetermined count value or not. If there is a group having a count value equals to or exceeds the predetermined value, a sound signal of the leading character 31 is read out in step S17 from the selection/event table storage section 20 so as to produce a response corresponded to such group, and the sound signal is then sent to the speaker unit 6b of the head set 3 worn by the player. Thus, the response of the leading character 31 is produced in a voice tone corresponded to the voice tone of the player.

On the other hand, the count values of the individual counters 10 can increase only within a range below a predetermined value when the player is in a period shortly after the beginning of the game or the player uses various voice tones.

In such case, the control section 17 discriminates that there is no group expressing a tendency in the player's voice zone, and then in step S19 reads out from the selection/event table storage section 20 a sound signal of the leading character 31 so as to make a response corresponded to the currently detected player's voice, and sends the sound signal to the speaker unit 6b of the head set 3 worn by the player. Thus, the response of the leading character 31 is produced again in a voice tone corresponded to the player's voice tone.

The above description will further be detailed assuming that the leading character 31 is a female character. As shown in FIG. 4, when the leading character 31 encounters with the enemy character 32, the control section 17 reads out voice information such as "Damn you!", "Don't be like a fool and show me the weak point!" or the like from those stored in the selection/event table storage section 20, and sends it to the head set 3 worn by the player.

When instructions such as "Take the fire thrower!" and "Aim at the belly!" were given by the player in response to such saying of the leading character 31, the control section 17 controls the display so as to make the leading character 31 have a fire thrower as an arm 33 and expel the enemy character 32 by throwing fire using such fire thrower.

On the other hand, when no instruction was given by the player to the leading character 31, the control section 17 selects a voice information such as "Are you hearing?" from those stored in the selection/event table storage section 20, and sends it to the head set 3 worn by the player, to thereby repeat the asking by the leading character 31 and prompt an answer from the player.

The player now gives answers to the leading character 31, which may be given in a variety of voice tones.

FIG. 15 shows exemplary positive answers to the question "Are you hearing?" by the leading character 31, which include "Yes, I am.", "Sure.", "Yeah." and "Hum, so what?".

"Yes, I am" corresponds to the polite voice tone, "Sure." to the gentle voice tone, "Yeah." to the general voice tone, and "Hum, so what?" to the negligent voice tone.

The control section 17 discriminates such player's voice tone in the processes from steps S12 to S14 shown in FIG. 14, classifies them into any one of "polite tone group", "gentle tone group", "general tone group" and "negligent tone group", and increments the counter 10 of a corresponding group by one.

Executing such increment every time the player's voice tone is analyzed will produce a tendency of the player's voice tone as being expressed by the count values of the individual voice tone groups as described in the above. So that if there is a group expressing a tendency of the player's voice tone, the control section 17 reads out, from the selection/event table storage section 20, voice information which belongs to a group corresponded to the player's voice tone, and supplies the voice information to the head set 3 worn by the player. On the contrary, if there is no group expressing a tendency of the player's voice tone, the control section 17 reads out in step S19 a currently analyzed voice information corresponded to the player's voice tone from the selection/event table storage section 20, and sends such voice information to the head set 3 worn by the player.

In such case for example, when the player answers as "Yes, I am." which belongs to the "polite tone group" in response to the question of "Are you hearing?" by the leading character 31, the control section 17 reads out voice information of the leading character 31 such as "Oops! Your polite answer makes me ill!", for example, from the selection/event storage section 20, and then sends the voice information to the head set 3 worn by the player.

Similarly, in the case that the player gave an answer of "Sure." or "Yeah." which belong to the "gentle tone group" and "general tone group", respectively, in response to the question of "Are you hearing?" by the leading character 31, the control section 17 reads out a casual voice information of the leading character 31 such as "OK!", for example, from the selection/event storage section 20, and then sends the voice information to the head set 3 worn by the player.

Similarly again, in the case that the player gave an answer of "Hum, so what?" which belong to the "negligent tone group" in response to the question of "Are you hearing?" by the leading character 31, the control section 17 reads out voice information of the leading character 31 such that "Why can you say in that way? I'm mad!", for example, from the selection/event storage section 20, and then sends the voice information to the head set 3 worn by the player.

The above description dealt with an exemplary case that the player gave a positive answer to the leading character 31. On the contrary, an exemplary case that the player gave a negative answer to such question is shown in FIG. 16.

The negatives answer to the question "Are you hearing?" by the leading character 31 include "No, I'm not.", "No, sorry.", "No." and "No, So what?".

"No, I'm not." corresponds to the polite voice tone, "No, sorry." to the gentle voice tone, "No." to the general voice tone, and "No, so what?" to the negligent voice tone.

When the player gave an answer of "No, I'm not." which belongs to the "polite tone group" in response to the question of "Are you hearing?" by the leading character 31, the control section 17 reads out voice information of the leading character 31 such that "Listen to me carefully, then!", for example, from the selection/event storage section 20, and then sends the voice information to the head set 3 worn by the player.

Similarly, in the case that the player gave an answer of "No, sorry." which belongs to the "gentle tone group" in response to the question of "Are you hearing?" by the leading character 31, the control section 17 reads out voice information of the leading character 31 such as "Then listen to me carefully 'cause I'll tell you once more!", for example, from the selection/event storage section 20, and then sends the voice information to the head set 3 worn by the player.

Similarly again, in the case that the player gave an answer of "No." which belongs to the "general tone group" in response to the question of "Are you hearing?" by the leading character 31, the control section 17 reads out voice information of the leading character 31 such as "Why ain't you listening to me? Don't make me repeat the same phrase!", for example, from the selection/event storage section 20, and then sends the voice information to the head set 3 worn by the player.

Still similarly, in the case that the player gave an answer of "No, so what?" which belongs to the "negligent tone group" in response to the question of "Are you hearing?" by the leading character 31, the control section 17 reads out voice information of the leading character 31 such as "Hey you! Are you really going to help me? Listen to me carefully 'cause I'll tell you once more!", for example, from the selection/event storage section 20, and then sends the voice information to the head set 3 worn by the player.

In this video game, the player and the leading character 31 are in a partnership for fighting with a common enemy. With such video game machine of this embodiment, the personality of the player can be simulated by the personality of the game character by altering the voice tone of the leading character 31 corresponding to that of the player. This successfully makes the player feel familiar to the game character and promotes empathy of the player, to thereby further enhance the enjoyment of the video game.

The above conversation between the player and the leading character 31 is none other than one example, and it is to be understood that the video game proceeds based on any other conversation between the player and the leading character 31, in which the voice tone of the leading character 31 can vary depending on the voice tone of the player.

After such control of the response for the leading character 31, the control section 17 determines in step S18 in FIG. 14 whether such battle-type video game is completed by discriminating whether the player issued an instruction of end of the game or not, or whether a series of the game story came to the end or not. For the case the end of the game was detected, the entire routine shown in the flow chart will complete without any other processing. For the case the end of the game was not detected, the process goes back to step S12, and the foregoing voice tone discrimination, group-classified registration and responding operation of the leading character 31 depending on the voice tone groups or on the player's voice tone will be repeated until the game over will be discriminated in step S18.

Effect of the Embodiment

As is clear from the above description, when a predetermined event such as appearance of the enemy character 32 occurred, the video game machine of this embodiment reads out parameters corresponded to such event to thereby control display of leading character's behavior based on such parameters, where such display of the leading character 31 can also be controlled by modifying such parameters according to the player's voice when it is recognized. This allows control of the leading character 31 both through the controller and sound and voice input.

Since the leading character 31 is controllable not only through the controller but also through the voice input, the player is readily empathized with the video game, which makes the player positively participate the game. Such pleasure in operating the game character enhances enjoyment of the video game.

Since also the control section 17 of course controls behaviors of the game characters based on the individual parameters, the behaviors of the game characters do not always depend on the voice input by the player, which provides another enjoyment of such video game.

Since the video game machine of this embodiment can modify the voice tone of the leading character 31 corresponding to that of the player, the personality of the leading character 31 can be matched to that of the player. This successfully makes the player feel familiar to the game character and promotes empathy of the player, to thereby further enhance the enjoyment of the video game.

While the above description dealt with the case in which the leading character 31 is operated by voice input for the simplicity of the understanding of the embodiment, it is also allowable to operate the enemy character 32 by such voice input. For example, operating the leading character 31 by one player and the enemy character 32 by the other player allows mutual attack through voice input, which will enhance interest of the video game.

While the above description dealt with the case in which the present invention was applied to a battle-type video game, any other types of video games will be allowable provided that the objects such as game characters are operated through voice input.

The embodiment described in the above is only part of the examples of the present invention. It is therefore to be understood that the present invention may be practiced in any modifications depending on the design or the like otherwise than as specifically described herein without departing from the scope and the technical spirit thereof.

What is claimed is:

1. A voice processing method comprising the steps of:
   detecting a voice tone based on inputted voice information;
   determining a plurality of groups corresponding to a plurality of voice data;
   classifying the detected voice tone into at least one of the plurality of groups; and
   outputting voice data whose voice tone corresponds to the detected voice tone;
   wherein the step of outputting voice data outputs voice data corresponding to the at least one group if a count of voice tones classified for the at least one group exceeds a predetermined number.

2. The voice processing method according to claim 1, wherein the step of detecting a voice tone further comprises the steps of:
analyzing the meaning of the inputted voice information; and determining the voice tone based on the analyzed meaning.

3. The voice processing method according to claim 1, wherein the step of detecting a voice tone further comprises the steps of:
analyzing the meaning of the inputted voice information;
detecting a voice level based on the inputted voice information; and
determining the voice tone based on the analyzed meaning and the detected voice level.

4. The voice processing method according to claim 1, wherein the plurality of groups includes at least a group for polite tone, a group for gentle tone, a group for general tone and a group for negligent tone.

5. The voice processing method according to claim 1, wherein the inputted voice information and the voice data are a voice of a game player and a game object, respectively.

6. A voice processing device comprising:
a voice tone detection means for detecting a voice tone based on inputted voice information;
a voice information storage means having stored therein voice data corresponded to a plurality of voice tones;
a group determination means for determining a plurality of groups corresponding to a plurality of voice data; and
a classification means for classifying the detected voice tone into at least one of the plurality of groups;
a counter for counting each classification into the at least one group; and
a voice output-control means for outputting voice data corresponded to the detected voice tone from the voice information storage means;
wherein the voice output-control means outputs voice data corresponding to the at least one group if a count of the counter exceeds a predetermined number.

7. The voice processing device according to claim 6, wherein the voice tone detection means analyzes meaning of the inputted voice information and determines the voice tone based on the analyzed meaning.

8. The voice processing device according to claim 6, wherein the voice tone detection means analyzes meaning of the inputted voice information and detects a voice level based on the inputted voice information, to thereby determine the voice tone based on the analyzed meaning of the inputted voice information and the detected voice level.

9. The voice processing device according to claim 6, further comprising:
a tendency detection means for detecting tendency in the detected voice tone; and
wherein the voice output-control means outputs voice data with a voice tone corresponded to a tendency in the detected voice tone.

10. The voice processing device according to claim 6, wherein the inputted voice information and the voice data are a voice of a game player and a game object, respectively.

11. A recording medium having recorded therein a voice processing program to be executed on a computer, in which the voice processing program executes the steps of:
detecting a voice tone based on inputted voice information;
determining a plurality of groups corresponding to a plurality of voice data;
classifying the detected voice tone into at least one of the plurality of groups; and
outputting voice data whose voice tone corresponds to the detected voice tone;
wherein the step of outputting voice data comprises the step of outputting voice data corresponding to the at least one group if a count of voice tones classified for the at least one group exceeds a predetermined number.

12. The recording medium having recorded therein a voice processing program according to claim 11, wherein the step of detecting a voice tone further comprises the steps of:
analyzing the meaning of the inputted voice information; and determining the voice tone based on the analyzed meaning.

13. The recording medium having recorded therein a voice processing program according to claim 11, wherein the step of detecting a voice tone further comprises the steps of:
analyzing the meaning of the inputted voice information;
detecting a voice level based on the inputted voice information; and
determining the voice tone based on the analyzed meaning and the detected voice level.

14. The recording medium having recorded therein a voice processing program according to claim 11, wherein the plurality of groups include at least a group for polite tone, a group for gentle tone, a group for general tone and a group for negligent tone.

15. The recording medium having recorded therein a voice processing program according to claim 11, wherein the inputted voice information and the voice data are a voice of a game player and a game object, respectively.

16. A computer having a processor and a memory storing a voice processing program to be executed by the computer, the voice processing program performing the steps of:
detecting a voice tone based on inputted voice information;
determining a plurality of groups corresponding to a plurality of voice data;
classifying the detected voice tone into at least one of the plurality of group; and
outputting voice data whose voice tone corresponds to the detected voice tone;
wherein the step of outputting voice data comprises the step of outputting voice data corresponding to the at least one group if a count of voice tones classified for the one group exceeds a predetermined number.

17. A voice processing device comprising:
a voice tone detection unit for detecting a voice tone based on inputted voice information;
a voice information storage unit having stored therein voice data corresponded to a plurality of voice tones;
a voice output-control unit for determining a plurality of groups corresponding to a plurality of voice data, for classifying the detected voice tone into at least one of the plurality of groups, and for outputting voice data corresponding to the detected voice tone from the voice information storage unit; and
a counter for registering a classification of the detected voice tone into the at least one group;
wherein the voice output-control unit outputs voice data corresponding to the at least one group if a count of the counter for voice tones classified for the at least one group exceeds a predetermined number.

* * * * *